(12) United States Patent
Ou

(10) Patent No.: US 8,330,627 B2
(45) Date of Patent: Dec. 11, 2012

(54) KEYBOARD

(75) Inventor: Guang-Feng Ou, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 325 days.

(21) Appl. No.: 12/792,709

(22) Filed: Jun. 2, 2010

(65) Prior Publication Data

US 2011/0279288 A1 Nov. 17, 2011

(30) Foreign Application Priority Data

May 17, 2010 (CN) .......................... 2010 1 0173814

(51) Int. Cl.
*H03K 17/94* (2006.01)
(52) U.S. Cl. ..... 341/22; 248/118; 248/118.3; 248/118.5
(58) Field of Classification Search ................... 341/22; 248/118, 118.3, 118.5
See application file for complete search history.

(56) References Cited

U.S. PATENT DOCUMENTS

| 4,976,407 | A | * | 12/1990 | Schwartz et al. | .......... 248/118.3 |
| 5,203,527 | A | * | 4/1993 | Rubey | ............ 248/118 |
| 5,374,018 | A | * | 12/1994 | Daneshvar | ............ 248/118 |
| 5,421,543 | A | * | 6/1995 | Rossman et al. | .......... 248/118.3 |
| 5,566,913 | A | * | 10/1996 | Prokop | ............ 248/118 |
| 5,568,907 | A | * | 10/1996 | Wolfe et al. | ............ 248/118 |
| 5,660,360 | A | * | 8/1997 | Yang | ............ 248/118 |
| 5,938,352 | A | * | 8/1999 | Chen | ............ 400/472 |
| 7,007,902 | B1 | * | 3/2006 | Root | .......... 248/118.3 |
| 7,341,227 | B2 | * | 3/2008 | Chen | ............ 248/118 |

* cited by examiner

*Primary Examiner* — Khai M Nguyen
(74) *Attorney, Agent, or Firm* — Altis Law Group, Inc.

(57) ABSTRACT

A keyboard includes a keyboard main body and a supporting apparatus. A first extending portion is extended from a sidewall of the keyboard main body. A number of keys are set on a top of the keyboard main body. A second extending portion is extended from a sidewall of the supporting apparatus and mounted to the first extending portion. A supporting device is set on a top of the supporting apparatus, opposite to the second extending portion.

17 Claims, 4 Drawing Sheets

KEYBOARD

BACKGROUND

1. Technical Field

The present disclosure relates to keyboards, and particularly to a computer keyboard.

2. Description of Related Art

With the development of computer technologies, computers have become important communication devices in daily life. However, when a computer user operates the computer keyboard for a long time, their wrist will tire or may even become injured.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure, including the drawings is illustrated by way of example and not by limitation. It should be noted that references to "an" or "one" embodiment in this disclosure are not necessarily to the same embodiment, and such references mean at least one.

Figure 1:
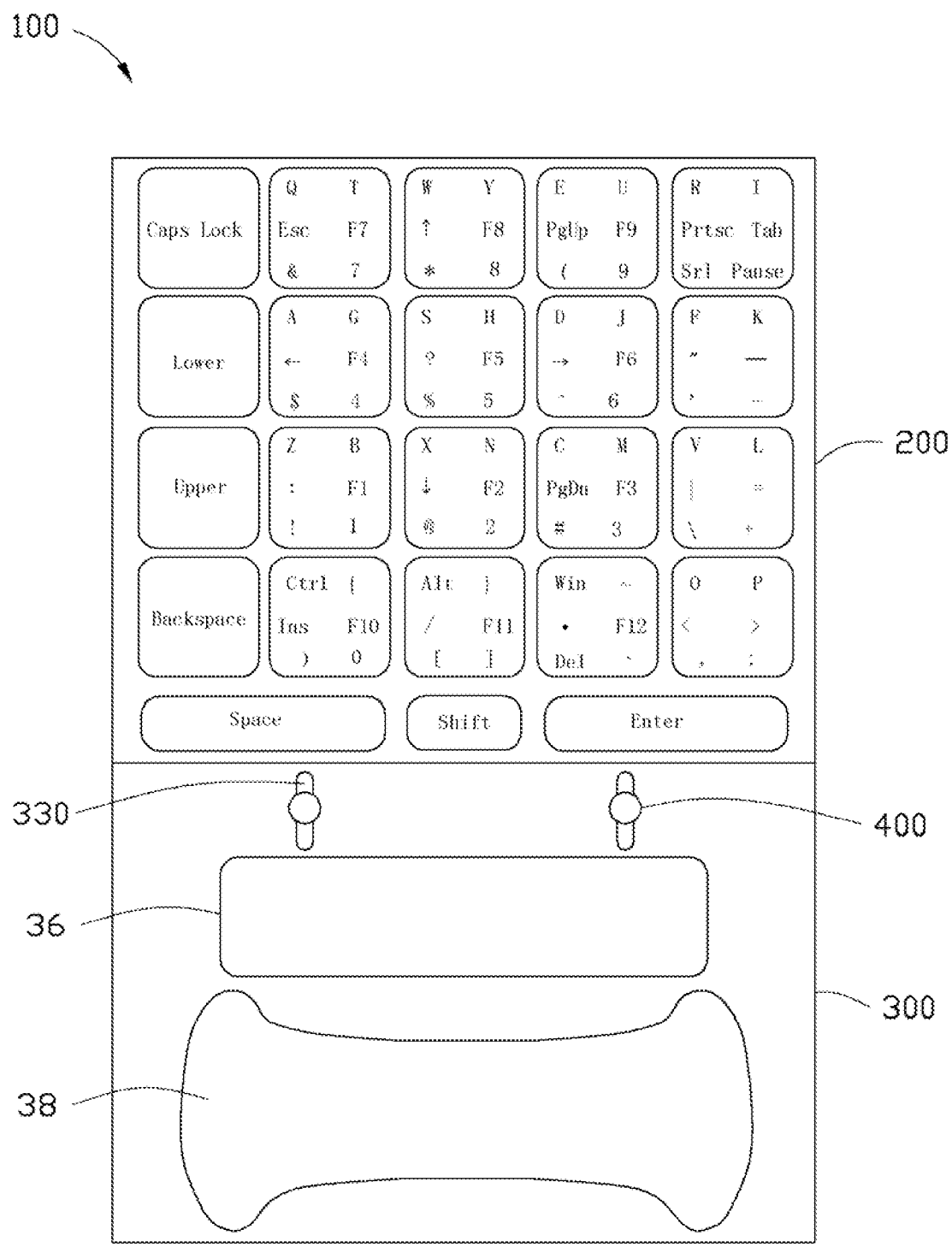
FIG. 1 is a schematic view of an exemplary embodiment of a keyboard.
Figure 2:
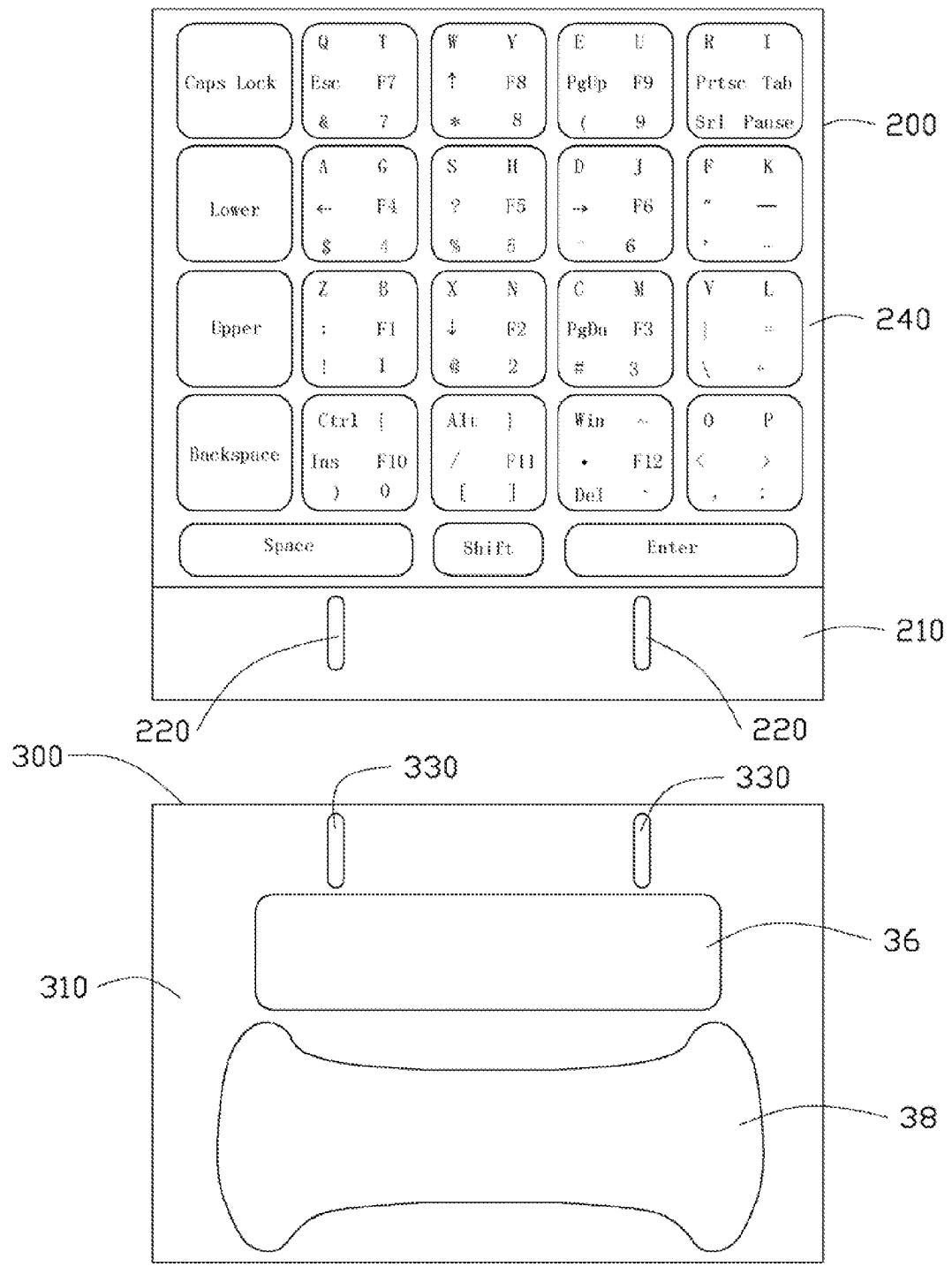
FIG. 2 is an exploded, schematic view of the keyboard of FIG. 1.
Figure 3:
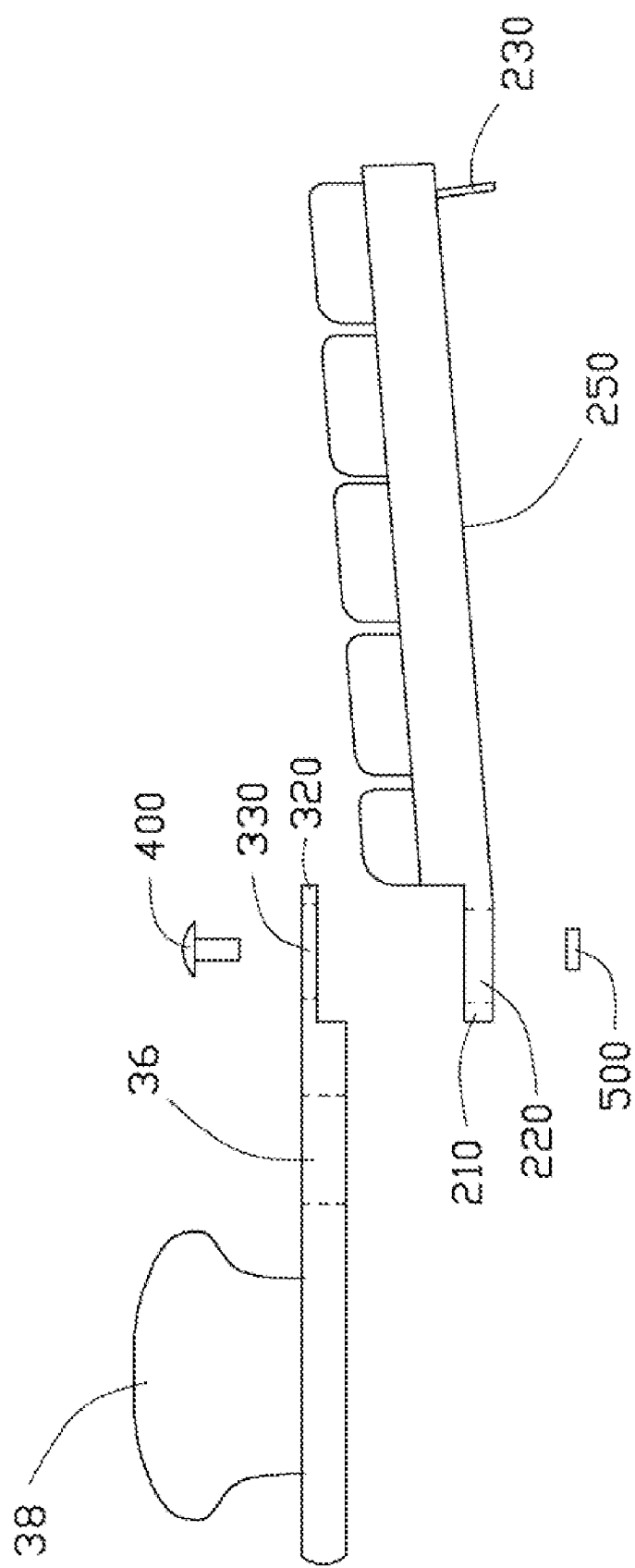
FIG. 3 is similar to FIG. 2, but viewed from another perspective.
Figure 4:
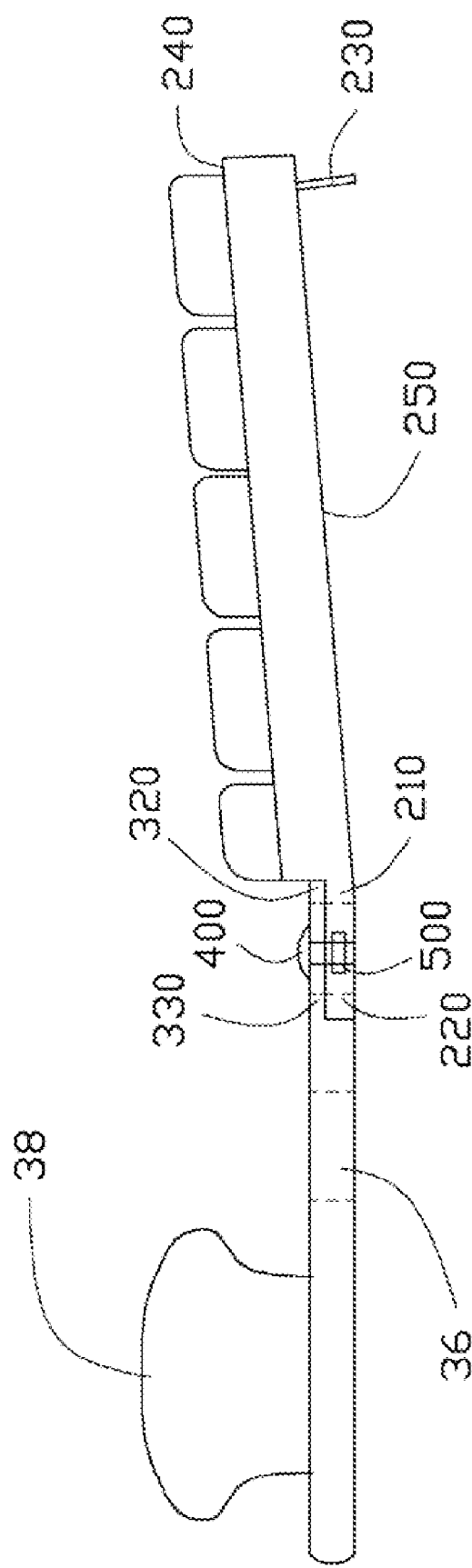
FIG. 4 is an assembled view of the keyboard of FIG. 3.

Referring to FIGS. 1 to 4, an exemplary embodiment of a keyboard 100 includes a keyboard main body 200 and a supporting apparatus 300. The keyboard main body 200 is substantially rectangular. An extending portion 210 is extended from a lower portion of a first sidewall of the keyboard main body 200. Two elongated through holes 220 are defined in the extending portion 210. Two adjusting pins 230 are set on a bottom 250 of the keyboard main body 200, adjacent to a second sidewall of the keyboard main body 200 opposite to the first sidewall, to raise a side of the keyboard main body 200 opposite to the extending portion 210.

A plurality of square first keys is set on a top 240 of the keyboard main body 200 and arranged in a four by five (4×5) matrix. The first row first key is labeled "Caps Lock". The first row second key is labeled "Q", "T", "Esc", "F7", "&", and "7". The first row third key is labeled "W", "Y", "↑", "F8", "*", and "8". The first row fourth key is labeled "E", "U", "PgUp", "F9", "(", and "9". The first row fifth key is labeled "R", "I", "Prtsc", "Tab", "Srl", and "Pause". The second row first key is labeled "Lower". The second row second key is labeled "A", "G", "←", "F4", "$", and "4". The second row third key is labeled "S", "H", "?", "F5", "%", and "5". The second row fourth key is labeled "D", "J", "→", "F6", "^", and "6". The second row fifth key is labeled "F", "K", """, "_", "'", and "-". The third row and first column first key is labeled "Upper". The third row second key is labeled "Z", "B", ":", "F1", "!", and "1". Third row third key is labeled "X", "N", "↓", "F2", "@", and "2". The third row fourth key is labeled "C", "M", "PgDn", "F3", "#", and "3". The third row fifth key is labeled "V", "L", "|", "=", "\", and "+". The fourth row first key is labeled "Backspace". The fourth row second key is labeled "Ctrl", "{", "Ins", "F10", ")", and "0". The fourth row third key is labeled "Alt", "}", "/", "F11", "[", and "]". The fourth row fourth key is labeled "Win", "~", ".", "F12", "Del", and "". The fourth row fifth key is labeled "O", "P", "<", ">", ",", and ";".

Three long second keys are arranged in a line on the keyboard main body 200, between the first keys and the extending portion 210, which are labeled "Space", "Shift", and "Enter", respectively. Arrangement of the first and second keys of the keyboard main body 200 can be changed according to need. In one embodiment, the keys labeled "Caps Lock", "Shift", "Upper", and "Lower" can be made of lighting material. The symbols of each first key of the second to fifth columns of the first to the fourth rows of the keyboard main body 200 are located on a top left corner, a top right corner, a left middle location, a right middle location, a lower left corner, and a lower right corner of each key.

In one embodiment, each key is labeled with six characters or icons each of which are pre-associated with an input and can be selectively input by pressing different key combinations. For example, an upper case located on a top left corner of a corresponding key can be input by pressing the "Caps Lock" key+the key. A lower case corresponding to an upper case of a top left corner of a corresponding key can be input by pressing the key. A upper case located on a top right corner of a corresponding key can be input by pressing the "Caps Lock" key+the "Shift" key+the key. A lower case corresponding to a upper case of a top right corner of a corresponding key can be input by pressing the "Shift" key+the key. A symbol located on a lower left corner of a corresponding key can be input by pressing the "Lower" key+the key. A symbol located on a lower right corner of a corresponding key can be input by pressing the "Lower" key+the "Shift" key+the key. A symbol located on a left middle location of a corresponding key can be input by pressing the "Upper" key+the key. A symbol located on a right middle location of a corresponding key can be input by pressing the "Upper" key+the "Shift" key+the key.

The following depicts how the letters and the symbols of the second key of the first row are input. The letter "Q" is located on a top left corner, the letter "T" is located on a top right corner, the symbol "Esc" is located on a left middle location, the symbol "F7" is located on a right middle location, the symbol "&" is located on a lower left corner, the symbol "7" is located on a lower right corner. The letter "Q" can be input by pressing the "Caps Lock" key+the second key of the first row, the letter "T" can be input by pressing the "Caps Lock" key+the "Shift" key+the second key of the first row, the letter "q" can be input only by pressing the second key of the first row, the letter "t" can be input by pressing the "Shift" key+the second key of the first row, the instruction of the symbol "Esc" can be executed by pressing the "Upper" key+the second key of the first row, the instruction of the symbol "F7" can be executed by pressing the "Upper" key+ the "Shift" key+the second key of the first row, the symbol "&" can be input by pressing the "Lower" key+the second key of the first row, the number "7" can be input by pressing the "Lower" key+the "Shift" key+the second key of the first row. Input ways of letters and symbols of the other keys are same as input ways of the letters and symbols of the second key of the first row.

The supporting apparatus 300 is substantially rectangular. An extending portion 320 is extended from an upper portion of a sidewall of the supporting apparatus 300. Two elongated through holes 330 are defined in the extending portion 320, corresponding to the through holes 220 of the extending portion 210 of the keyboard main body 200. A supporting device 38 protrudes up from a top 310 of the supporting apparatus 300, opposite to the extending portion 320, to support a wrist of a keyboard user. A rectangular opening 36 is defined in the supporting apparatus 300, between the through holes 330 and the supporting device 38, for carrying the keyboard 100 conveniently. In one embodiment, the supporting device 38 is made of soft latex, and the shape of the supporting device 38 can be designed according to need.

In assembly, the extending portion 210 of the keyboard main body 200 is placed under the extending portion 320 of the supporting apparatus 300. The through holes 330 of the extending portion 320 align with the corresponding through holes 220 of the extending portion 210. Two screws 400 pass the through holes 330 and 220 respectively, and then are engaged in two screw caps 500, to connect the keyboard main body 200 to the supporting apparatus 300. A distance between the supporting apparatus 300 and the keyboard main body 200 can be adjusted by adjusting location of the screws 400 in the through holes 330 and 220 according to sizes of hands of different keyboard users.

The keyboard 100 reduces the number of the keys by rearrangement keys on the keyboard main body 200, thereby the keyboard 100 can be operated by a single hand. The supporting apparatus 300 can reduce wrist fatigue of the keyboard user, and a distance between the supporting device 38 and the keyboard main body 200 can be adjusted by adjusting location of the screws 400 in the through holes 330 and 220 according to sizes of hands of different keyboard users.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A keyboard comprising:
 a keyboard main body with a plurality of keys set on a top of the keyboard main body, wherein a first extending portion extends from a sidewall of the keyboard main body; and
 a supporting apparatus, wherein a second extending portion extends from a sidewall of the supporting apparatus to be mounted to the first extending portion, a supporting device protrudes up from a top of the supporting apparatus, opposite to the second extending portion, to support a wrist of a keyboard user.

2. The keyboard of claim 1, wherein the second extending portion is detachably mounted to the first extending portion.

3. The keyboard of claim 2, wherein the second extending portion is mounted to the first extending portion by screws.

4. The keyboard of claim 3, wherein the first extending portion defines at least one first through hole, the second extending portion defines at least one second through hole, wherein at least one screw extends through the at least one first through hole and the at least one second through hole.

5. The keyboard of claim 4, wherein each of the at least one first through hole and the at least one second through hole is elongated, position of the at least one screw in the at least one first through hole and the at least one second through hole is adjustable, to adjust a distance between the supporting device and the keyboard main body.

6. The keyboard of claim 5, wherein the number of the at least one first through hole is two and the number of the at least one second through hole is two.

7. The keyboard of claim 1, wherein two adjusting pins extend from a bottom of the keyboard main body, opposite to the first extending portion, to raise a side of the keyboard main body adjacent to the adjusting pins.

8. The keyboard of claim 1, wherein the plurality of keys comprises twenty first keys arranged in a four by five matrix, the first row first key is labeled "Caps Lock", the first row second key is labeled "Q", "T", "Esc", "F7", "&", and "7", the first row third key is labeled "W", "Y", "↑", "F8", "*", and "8", the first row fourth key is labeled "E", "U", "PgUp", "F9", "(", and "9", the first row fifth key is labeled "R", "I", "Prtsc", "Tab", "Srl", and "Pause";
 wherein the second row first key is labeled "Lower", the second row second key is labeled "A", "G", "←", "F4", "$", and "4", the second row third key is labeled "S", "H", "?", "F5", "%", and "5", the second row fourth key is labeled "D", "J", "→", "F6", "^", and "6", the second row fifth key is labeled "F", "K", """, "_", """, and "-";
 wherein the third row first key is labeled "Upper", the third row second key is labeled "Z", "B", ":", "F1", "!", and "1", the third row third key is labeled "X", "N", "↓", "F2", "@", and "2", the third row fourth key is labeled "C", "M", "PgDn", "F3", "#", and "3", the third row fifth key is labeled "V", "L", "|", "=", "\", and "+"; wherein the fourth row first key is labeled "Backspace", the fourth row second key is labeled "Ctrl", "{", "Ins", "F10", ")", and "0", the fourth row third key is labeled "Alt", "}", "/", "F11", "[", and "]", the fourth row fourth key is labeled "Win", "~", ".", "F12", "Del", and "'", the fourth row fifth key is labeled "O", "P", "<", ">", ",", and ";".

9. The keyboard of claim 8, wherein the plurality of keys further comprises three second keys labeled "Space", "Shift", and "Enter", respectively.

10. The keyboard of claim 9, wherein the labeled letters or symbols of each of the first keys of second to fifth column of the first to fourth rows are located on a top left corner, a top right corner, a left middle location, a right middle location, a lower left corner, and a lower right corner of each key, wherein a upper case located on the top left corner is input by pressing the "Caps Lock" key+the corresponding first key, a lower case corresponding to the upper case located on the top left corner is input only by pressing the corresponding key, a upper case located on the top right corner is input by pressing the "Caps Lock" key+the "Shift" key+the corresponding first key, a lower case corresponding to the upper case located on the top right corner is input by pressing the "Shift" key+the corresponding first key, a symbol located on the lower left corner is input by pressing the "Lower" key+the corresponding first key, a symbol located on the lower right corner is input by pressing the "Lower" key+the "Shift" key+the corresponding first key, a symbol located on the left middle location is input by pressing the "Upper" key+the corresponding first key, a symbol located on the right middle location is input by pressing the "Upper" key+the "Shift" key+the corresponding first key.

11. The keyboard of claim 1, wherein the supporting device is made of soft latex.

12. A keyboard comprising:
 a keyboard main body with a plurality of keys set on a top of the keyboard main body, wherein a first extending portion extends from a sidewall of the keyboard main body; and a supporting apparatus, wherein a second extending portion extends from a sidewall of the supporting apparatus to be mounted to the first extending portion, a supporting device protrudes up from a top of the supporting apparatus, opposite to the second extending portion, wherein the first extending portion defines at least one first through hole, the second extending portion defines at least one second through hole, and at least one screw extends through the at least one first through hole and the at least one second through hole, to mount the second extending portion to the first extending portion.

13. The keyboard of claim 12, wherein each of the at least one first through hole and the at least one second through hole is elongated, position of the at least one screw in the at least one first through hole and the at least one second through hole is adjustable, to adjust a distance between the supporting device and the keyboard main body.

14. The keyboard of claim 13, wherein the number of the at least one first through hole is two and the number of the at least one second through hole is two.

15. A keyboard comprising:
a keyboard main body with a plurality of keys set on a top of the keyboard main body, wherein a first extending portion extends from a sidewall of the keyboard main body; and
a supporting apparatus, wherein a second extending portion extends from a sidewall of the supporting apparatus to be mounted to the first extending portion, a supporting device protrudes up from a top of the supporting apparatus, opposite to the second extending portion, wherein the plurality of keys comprises twenty first keys arranged in a four by five matrix, the first row first key is labeled "Caps Lock", the first row second key is labeled "Q", "T", "Esc", "F7", "&", and "7", the first row third key is labeled "W", "Y", "↑", "F8", "*", and "8", the first row fourth key is labeled "E", "U", "PgUp", "F9", "(", and "9", the first row fifth key is labeled "R", "I", "Prtsc", "Tab", "Srl", and "Pause"; wherein the second row first key is labeled "Lower", the second row second key is labeled "A", "G", "←", "F4", "$", and "4", the second row third key is labeled "S", "H", "?", "F5", "%", and "5", the second row fourth key is labeled "D", "J", "→", "F6", """, and "6", the second row fifth key is labeled "F", "K", """, "_", """, and "-"; wherein the third row first key is labeled "Upper", the third row second key is labeled "Z", "B", ":", "F1", "!", and "1", the third row third key is labeled "X", "N", "↓", "F2", "@", and "2", the third row fourth key is labeled "C", "M", "PgDn", "F3", "#", and "3", the third row fifth key is labeled "V", "L", "|", "=", "\", and "+"; wherein the fourth row first key is labeled "Backspace", the fourth row second key is labeled "Ctrl", "{", "Ins", "F10", ")", and "0", the fourth row third key is labeled "Alt", "}", "/", "F11", "[", and "]", the fourth row fourth key is labeled "Win", "~", ".", "F12", "Del", and "", the fourth row fifth key is labeled "O", "P", "<", ">", ",", and ";".

16. The keyboard of claim 15, wherein the plurality of keys further comprises three second keys labeled "Space", "Shift", and "Enter", respectively.

17. The keyboard of claim 16, wherein the labeled letters or symbols of each of the first keys of second to fifth column of the first to fourth rows are located on a top left corner, a top right corner, a left middle location, a right middle location, a lower left corner, and a lower right corner of each key, wherein a upper case located on the top left corner is input by pressing the "Caps Lock" key+the corresponding first key, a lower case corresponding to the upper case located on the top left corner is input only by pressing the corresponding key, a upper case located on the top right corner is input by pressing the "Caps Lock" key+the "Shift" key+the corresponding first key, a lower case corresponding to the upper case located on the top right corner is input by pressing the "Shift" key+the corresponding first key, a symbol located on the lower left corner is input by pressing the "Lower" key+the corresponding first key, a symbol located on the lower right corner is input by pressing the "Lower" key+the "Shift" key+the corresponding first key, a symbol located on the left middle location is input by pressing the "Upper" key+the corresponding first key, a symbol located on the right middle location is input by pressing the "Upper" key+the "Shift" key+the corresponding first key.

* * * * *